United States Patent

Uetake et al.

[11] 4,072,408
[45] Feb. 7, 1978

[54] LENS MOUNT FOR A MICROSCOPE OBJECTIVE

[75] Inventors: Toshifumi Uetake; Tsutomu Tojyo, both of Hachiouji, Japan

[73] Assignee: Olympus Optical Co., Ltd., Japan

[21] Appl. No.: 669,474

[22] Filed: Mar. 23, 1976

[30] Foreign Application Priority Data

Mar. 28, 1975   Japan ................................ 50-40955

[51] Int. Cl.² .............................................. G02B 7/04
[52] U.S. Cl. ....................................... 350/255; 350/46
[58] Field of Search ..................................... 350/39–44, 350/46–49, 57, 76–79, 255; 33/DIG. 11

[56] References Cited

U.S. PATENT DOCUMENTS 3,033,079   5/1962   Haupt et al. .......................... 350/57

3,633,278   1/1972   Ron ..................................... 33/141 D

FOREIGN PATENT DOCUMENTS 677,704   8/1952   United Kingdom ................. 350/255

Primary Examiner—John K. Corbin
Assistant Examiner—Wm. H. Punter
Attorney, Agent, or Firm—Cushman, Darby & Cushman

[57] ABSTRACT

A lens mount for a microscope objective comprising a correcting ring, which is used for moving a part of lenses constituting the objective along the optical axis in order to correct deterioration of the image, and a friction band arranged around the outer surface of said correcting ring and made of material such as rubber so that said correcting ring can be easily rotated by rubbing said friction band by a finger bulb.

2 Claims, 1 Drawing Figure

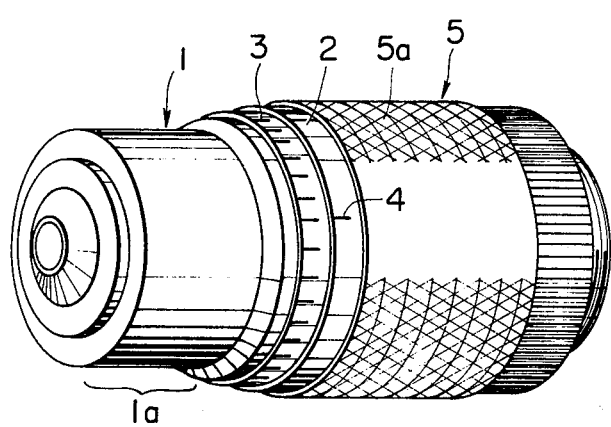

LENS MOUNT FOR A MICROSCOPE OBJECTIVE

BACKGROUND OF THE INVENTION a. Field of the Invention

The present invention relates to a lens mount for a microscope objective.

b. Description of the Prior Art

Generally, a microscope is provided with a plural number of objectives respectively different in magnification. When exchanging the objective to be used for observation, a revolver is revolved by holding one of objectives. Usually, the observer touches the objective only when he revolves the revolver.

Recently, however, extremely precise observation and measurement are required for scientific researches in the field of medical science and, consequently, deterioration of the image obtained by the microscope objective caused by the influence of variation in thickness of the cover glass has come into question though such deterioration of the image was neglected in the past. Now, it is therefore required to take some countermeasure to prevent such deterioration of the image caused by variation in thickness of the cover glass and to materialize a means for such countermeasure. To meet this requirement, a microscope objective arranged as follows has been developed. That is, said microscope objective is arranged to move a part of lenses constituting the lens system along the optical axis and to thereby correct or prevent said deterioration of the image caused by the above-mentioned variation in thickness of the cover glass. For the microscope objective having such lens system, it is necessary to provide a correcting mechanism for moving a part of lenses to the lens mount of the objective and to move said part of lenses by rotating a correcting ring which constitutes said correcting mechanism and is arranged on the outer surface of the lens mount.

On microscopes, however, many objectives respectively different in magnification are mounted to the revolver and, therefore, spaces between respective objectives are very small and are not sufficient to insert the observer's fingers therein. When microscope objectives having the above-mentioned correcting mechanism are mounted to such revolver, it is very difficult to rotate said correcting ring by holding said correcting ring by fingers. Moreover, as the diameter of the lens mount of the objective cannot be made large, it is necessary to make the thickness of the correcting ring as small as possible. When, therefore, such thin correcting ring is held by fingers in order to rotate it, the correcting ring will be deformed and it will become impossible to rotate the correcting ring smoothly.

To solve the above problem, it may be possible to rotate the correcting ring by rubbing the surface of the correcting ring by a finger bulb. In that case, however, a correcting ring having knurled outer surface is unsatisfactory because fingers will slip when rotating the correcting ring by rubbing said knurled surface by a finger bulb and the correcting ring cannot be rotated smoothly.

SUMMARY OF THE INVENTION

It is, therefore, a primary object of the present invention to provide a lens mount for a microscope objective, said microscope objective comprising a correcting mechanism arranged to correct deterioration of the image by moving a part of lenses constituting the lens system along the optical axis, said lens mount for a microscope objective comprising a correcting ring rotatably mounted to said microscope objective for the purpose of moving said part of lenses along the optical axis and a friction band arranged round the outer surface of said correcting ring and made of such material as soft rubber or the like, said correcting ring being rotated by rubbing said friction band by a finger bulb.

Another object of the present invention is to provide a lens mount for a microscope objective in which knurling is formed on the surface of said friction ring so that said correcting ring can be rotated more smoothly.

BRIEF DESCRIPTION OF THE DRAWING

The accompanying drawing shows a perspective view of an embodiment of the lens mount according to the present invention.

DETAILED DESCRIPTION OF THE PREFERRED EMBODIMENTS

Referring to the accompanying drawing, numeral 1 designates a lens mount of an objective, numeral 2 designates a correcting ring, numeral 3 designates graduations provided on the outer surface of the lens mount for the purpose of indicating the value of correction, and numeral 4 designates a pointer provided on the correcting ring 2. Numeral 5 designates a friction band provided round the outer surface of the correcting ring 2 and made of material such as soft rubber or the like. On the outer surface of the friction band 5, knurling 5a is formed.

As the lens mount for a microscope objective according to the present invention is constructed as explained in the above, it is possible to smoothly rotate the correcting ring 2 only by gently rubbing the surface of the friction band 5, which is provided round the outer surface of the correcting ring 2, by a finger bulb because of adequate friction of said friction band 5. Thus, it is possible to easily correct deterioration of the image caused by variation in thickness of the cover glass.

The knurling 5a formed on the surface of the friction band 5 may be omitted. When, however, adequate knurling is formed, the correcting ring can be rotated more smoothly.

When mounting the objective to the revolver, the correcting ring 2 may rotate in respect to the lens mount 1 if the objective is screwed in by holding the portion of the friction band 5. To prevent the above, knurling may be formed at the end portion of the lens mount 1 of the objective, i.e., at the portion designated by numeral 1a from the portion near the graduations 3 toward the end of the lens mount, said knurling being formed either over the whole surface of the portion 1a of the lens mount or formed in a narrow band at a part of said portion 1a. Then, the objective can be easily mounted to and dismounted from the revolver by holding the knurled portion and, consequently, it is possible to prevent the above-mentioned inconvenience.

We claim:

1. A lens mount for a microscope objective comprising a correcting thin ring for moving a part of lenses constituting the objective along the optical axis for the purpose of correcting aggravation of aberrations caused by variation in thickness of cover glasses, and a friction band arranged round the outer surface of said correcting ring for finger bulb movement of said ring and made of soft and frictional material such as rubber, said microscope objective being used by mounting to a revolver closely spaced to other microscope objectives which necessitates said ring being thin and being arranged to correct aggravation of aberrations by moving said part of lenses by rotating said friction band.

2. A lens mount for a microscope objective according to claim 1, in which knurling is formed on the surface of said friction band.

* * * * *